United States Patent [19]

Sato

[11] 3,783,386

[45] Jan. 1, 1974

[54] EQUALIZER OF PRESET TYPE FOR QUADRATURE AMPLITUDE MODULATED SIGNALS

[75] Inventor: Yoichi Sato, Tokyo, Japan

[73] Assignee: Nippon Electric Company, Limited, Tokyo, Japan

[22] Filed: June 12, 1972

[21] Appl. No.: 261,949

[30] Foreign Application Priority Data

June 16, 1971 Japan.............................. 46/42545

[52] U.S. Cl..................... 325/321, 325/325, 333/18

[51] Int. Cl............................................. H04b 1/16

[58] Field of Search................ 325/42, 65, 325–326, 325/473–477; 333/17, 18

[56] References Cited

UNITED STATES PATENTS 3,676,804 7/1972 Mueller................................ 333/18

3,524,169 8/1970 McAuliffe et al.................... 325/42

*Primary Examiner*—Albert J. Mayer

*Attorney*—Sidney G. Faber et al.

[57] ABSTRACT

An equalizer of the preset type for a demodulated quadrature amplitude modulated signal comprises sampling means for simultaneously deriving a predetermined number, $2N + 1$, of the unit impulse response characteristic samples $z(kT - hT)$ at each of sampling times $kT$ [$z(t)$, a unit impulse response characteristic of complex amplitude; $T$, the code pulse interval; $t = 0$, the time of occurrence of the greatest complex amplitude; $k$ and $h = -N, \ldots, 0, 1, \ldots, N$], variable gain means for simultaneously deriving a plurality of amplitude varied signal samples $C_h \cdot z(kT - hT)$ at each of the sampling times $kT$, and adjusting means for adjusting the variable gains $C_h$ with reference to the sampling times, the greatest complex amplitude, and the amplitude varied signal samples.

4 Claims, 7 Drawing Figures

EQUALIZER OF PRESET TYPE FOR QUADRATURE AMPLITUDE MODULATED SIGNALS

BACKGROUND OF THE INVENTION

This invention relates to an equalizer of the preset type for removing at the receiving end the intersymbol or cross-channel interferences introduced into a received quadrature amplitude modulated signal by the transmission line for such a signal.

It has been known to automatically equalize a received multi-level amplitude modulated signal so as to obviate the intersymbol interferences for the purpose of pertinent decoding. It has, however, been impossible to effectively equalize a received quadrature amplitude modulated signal because it has hitherto been difficult to simultaneously eliminate the interferences between the in-phase and the quadrature signals.

SUMMARY OF THE INVENTION

It is therefore an object of the present invention to provide an equalizer of the preset type for use in removing the intersymbol interferences in a received quadrature amplitude modulated signal.

It is another object of this invention to provide an equalizer of the type described, which is automatically presettable by only applying thereto a limited number of individual signals representative of the unit impulse response characteristic of the transmission line between the transmitting end and the receiving end.

According to this invention there is provided an equalizer for equalizing demodulated signals obtained by demodulating quadrature amplitude modulated signals sent thereto through a transmission line having an impulse response characteristics from a transmitting end for a series of communication code pulses generated thereat at a predetermined code pulse interval $T$, comprising a two-dimensional transversal filter having variable gain units of complex variable gains $C_k$ and responsive to said demodulated signals for producing equalized signals, the letter $k$ being representative of at least a predetermined number of a plurality of consecutive integers including zero, a clock pulse generator for producing clock pulses whose repetition period is substantially equal to said code pulse interval, and means for presetting said variable gains in response to a limited number of test signals supplied to said equalizer, each of said test signals being representative of said impulse response characteristics and given by a complex signal $z(t)$, where $t$ represents time for each of said test signals, said complex signal having the greatest complex amplitude $z_0$ substantially at $t=0$, the greatest complex amplitudes of said test signals being spaced with respect to time at least said code pulse interval multiplied by the number of said integers, said gain presetting means comprising:

means responsive to said clock pulses and a quasi-equalized complex signal $s(t)$ produced by said transversal filter responsive to each of said test signals for producing complex error signals representative of errors $e(kT)$ of said quasi-equalized signal at time points $kT$, means responsive to each of said test signals for holding a greatest amplitude complex signal representative of the greatest amplitude of each test signal, means responsive to each of the error signals produced responsive to each of said test signals and the greatest amplitude signal held for each test signal for producing an adjustment signal representative of a complex amount of adjustment $d_h$ determined in accordance with a set of rules given by $d_h = D$ — when — $-\mathrm{Re}[z(0)\cdot e^*(hT)] > |\mathrm{Im}[z(0)\cdot e^*(hT)]|$, $d_h = -D$ — when — $\mathrm{Re}[z(0)\cdot e^*(hT)] > |\mathrm{Im}[z(0)\cdot e^*(hT)]|$, $d_h = jD$ — when — $\mathrm{Im}[z(0)\cdot e^*(hT)] > |\mathrm{Re}[z(0)\cdot e^*(hT)]|$, and $d_h = -jD$ — when — $-\mathrm{Im}[z(0)\cdot e^*(hT)] > |\mathrm{Re}[z(0)\cdot e^*(hT)]|$, where $h$ is that one of the integers $h$ which gives the error $e(hT)$ represented by said each error signal, D is a predetermined amount, $j$ is the imaginary unit, Re and Im represent the real and the imaginary parts, and $e^*(hT)$ is the conjugate complex number of the last-mentioned error, and means responsive to said clock pulses and said adjustment signal for adjusting that one of said variable gains by the amount of adjustment $d_h$ represented by the last-mentioned adjustment signal which has the same suffix $h$ as the last-mentioned amount of adjustment.

DESCRIPTION OF THE PREFERRED EMBODIMENTS

Figure 1:
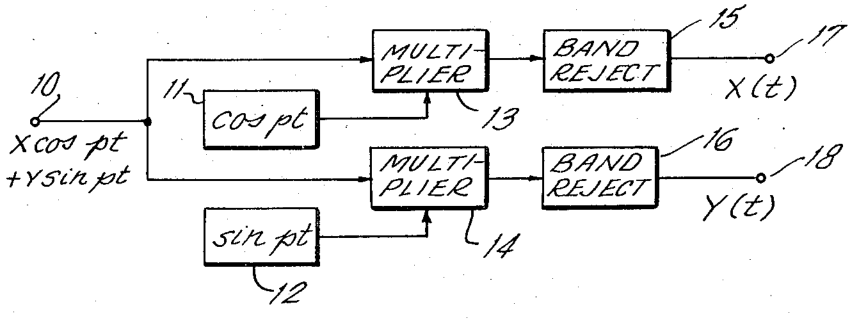
FIG. 1 is a block diagram of a demodulator used preceding an equalizer according to the instant invention.

Referring to FIG. 1, a receiver or demodulator for an incoming quadrature amplitude modulated signal given by $$X(t)\cdot\cos pt + Y(t)\cdot\sin pt$$

comprises an input terminal 10 supplied with the incoming signal, a pair of oscillators 11 and 12 for producing oscillator output signals represented by cos $pt$ and sin $pt$, respectively, and a pair of multipliers 13 and 14 supplied with the incoming signal on the one hand and the oscillator output signals, respectively, on the other hand. The demodulator further comprises a pair of band rejection filters 15 and 16 for eliminating the $2p$ angular frequency component from the respective multiplier output signals, and a first and a second output terminal 17 and 18 for the respective band rejection filter output signals. It is easily understood from the double angle formulae for sine and cosine that the signals obtained at the first and the second output terminals 17 and 18 are $X(t)$ and $Y(t)$, respectively. For convenience of the following description, the so demodulated signals $X(t)$ and $Y(t)$ will be regarded as the real and the imaginary parts of a complex demodulated signal $Z(t)$.

Figure 2:
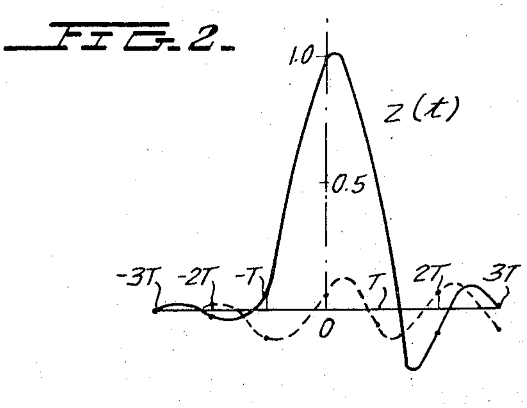
FIG. 2 shows typical wave forms of the demodulated signal for a quadrature amplitude modulated code pulse.
Figure 3:
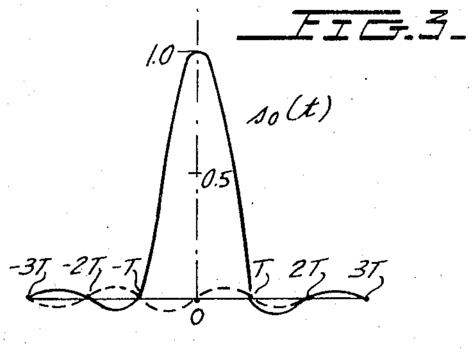
FIG. 3 shows typical wave forms of the equalized signal for the demodulated signal depicted in FIG. 2.

Referring to FIGS. 2 and 3, it is to be pointed out that the individual code pulses generated at the transmitting end are subjected to distortion while passing through the frequency division multiplex systems. This causes a single code pulse generated at the transmitting end to spread in the demodulated signal in such a manner that the demodulated signal for the single code pulse or unit impulse response characteristic $z(t)$ has a wave form typically illustrated in FIG. 2 with the solid line and the broken line curves for the real and the imaginary parts, respectively, where the abscissa shows the time $t$ in terms of the ordinary code pulse interval T for the successive communication code pulses generated at the transmitting end with the origin 0 of the time axis put at the time at which the absolute value of the complex amplitude of the unit impulse response characteristic becomes the greatest and the ordinate represents the amplitude with the greatest real amplitude taken as units. It follows therefore that the demodulated signal $Z(t)$ for the incoming signal is given by $$Z(t) = \Sigma\,(A_k + jB_k)\cdot z(t - kT),$$

where the factors $(A_k + jB_k)$ represent complex transmission data generated at the transmitting end to become the demodulated pulses at time points $k$T, where $k$ represents integers. The fact that those relative amplitudes of the unit impulse response characteristic $z(t)$ which appear at time points spaced from the time of occurrence of the greatest complex amplitude by positive and negative integral multiples of the ordinary code pulse interval, such as the relative amplitudes shown in FIG. 2 at $t = \pm T, \pm 2T, \ldots$, are not zero but generally finite gives rise to the intersymbol interference to make it impossible to decode the demodulated signal into the original transmission data unless the demodulated signal for the transmission data were equalized so that the real and the imaginary parts of the resulting equalized signal for the unit impulse response characteristic be characterized by a peak at $t=0$ and zeros at $t=\pm T, \pm 2T, \ldots$ on the one hand and zeros at $t = 0, \pm T, \pm 2T, \ldots$ on the other hand, respectively, as exemplified in FIG. 3. As the case may be, the equalized signal may have a finite imaginary amplitude at $t = 0$ as will be understood with reference to the phase locking techniques for the quadrature transmission systems.

Before describing the circuitry and operation of the preferred embodiments of the present invention, the principles of this invention will be explained.

At the outset it may be surmised that an equalizer according to this invention is preset before the practical use thereof by a limited number $m$ of congruent test pulses generated at the code pulse generator placed at a transmitting end at intervals greater than a predetermined interval that will become clear later. Let a quasi-equalized impulse response characteristic $s(t)$ be defined as $$s(t) = \sum_{k=-N}^{N} C_k \cdot z(t - kT),$$

where the factors $C_k$ represent a plurality of complex variable gains, 2N + 1 in number. The problem here is to determine those optimum values $C_k^{(m)}$ of the variable gains based on the demodulated signal for each of the successive test pulses or unit impulse response characteristics $z(t)$ which make the quasi-equalized characteristic $s(t)$ eventually become the closest possible approximation of that equalized signal $s_0(t)$ for each test pulse, the characteristics of which are exemplified in FIG. 3. Reference to FIG. 3 will readily reveal that the approximation may be evaluated by the value of a formula Q given by $$Q = \sum_{k=-\infty}^{\infty} |s(kT)|/|s(O)| - 1$$

with any phase rotation being allowed. In this connection, it should be added that adjustment of the phases of the oscillators 11 and 12 enables the greatest complex amplitude of the quasi-equalized signal to have no imaginary component without changing the value of the formula Q.

On determining the opitmum values $C_k^{(m)}$, it may be assumed from FIG. 2 that $$\sum_{k=-\infty}^{\infty} |z(kT)| - |z(O)| < |z(O)|, \tag{1}$$

the left hand side representing a measure of the intersymbol interferences of the impulse response characteristic. When Inequality (1) holds, it is possible to show that the optimum variable gains which will minimize the formula Q are obtained from either of the following two systems of simultaneous equations, each system consisting of a finite number of linear equations. When it is desired to derive an equalized signal $s(t)$ for which the value of $s(0)$ is a predetermined real number $R_0$, the optimum values are obtained as a set of solutions of a first system of simultaneous linear equations given by $$\sum_{h=-N}^{N} C_h \cdot z(kT - hT) - R_k = O, \tag{2}$$

where $R_k$ is equal to zero when $k = \pm 1, \pm 2, \ldots, \pm N$. When it is desired to derive an equalized signal $s(t)$ for which the real and the imaginary components of the value of $s(0)$ are given by the real and the imaginary amplitudes $z(0)$ of the unit impulse response characteristic, the optimum values are determined by the solutions of a second system of simultaneous linear equations given by $$\sum_{h=-N}^{N} C_h \cdot z(kT - hT) = O \tag{3}$$

for $k = \pm 1, \pm 2, \ldots, \pm N$, while the so-to-speak variable gain $C_0$ is an invariant which may be the unit gain. It may be mentioned here that the signals $z(kT - hT)$ represent a plurality of demodulated signal samples simultaneously derived for the unit impulse response characteristic $z(t)$ at each of the sampling times $k$T and that each set of the demodulated signal samples has the greatest absolute value of the amplitude at $k = h$. In addition, the terms summed up $C_k \cdot z(kT - hT)$ in each of Equations (2) and (3) are the amplitude varied signal samples derived at each of the sampling times $k$T.

Inasmuch as it is troublesome to directly solve Equations (2) or (3) because of the repeated calculation of the determinants, this invention makes use of the successive correction method, with errors $e(kT)$ defined by for the respective linear equations $$e(kT) = \sum_{h=-N}^{N} C_h \cdot z(kT - hT) - R_k$$

being introduced. It may be either that the initial values $C_h^{(0)}$ of the variable gains $C_h$ are given as the results of the presetting of the equalizer preceding the previous use thereof or that the variable gains are at first given arbitrary values, such as the unit gains. When the initial variable gains $C_h^{(0)}$ are varied or adjusted by the respective small amounts or variations $d_h$ which will later be where $e^*(hT)$ represent the conjugate complex variables of the errors $e(hT)$. As will later be seen from the circuitry of the preferred embodiments, each set of the variable gains $C_h^{(0)}, \ldots,$ or $C_h^{(m-1)}$ may successively be adjusted starting at $C_N$ and ending at $C_{-N}$.

This simple algorithm will now be reviewed. The sum F assumes a value given by $$\begin{aligned} F \downarrow \Delta F_h &= \sum_{k=-N}^{N} \left| \sum_{i=-N}^{N} C_h \cdot z(kT-iT) \downarrow d_h \cdot z(kT-hT) - R_k \right| \\ &= \sum_{\substack{k=-N \\ k\neq h}}^{N} \left| \sum_{i=-N}^{N} C_h \cdot z(kT-iT) \downarrow d_h \cdot z(kT-hT) - R_k \right| \downarrow \left| \sum_{i=-N}^{N} C_h \cdot z(hT-iT) \downarrow d_h \cdot z(O) - R_k \right| \\ &\leq \sum_{\substack{k=-N \\ k\neq h}}^{N} \left| \sum_{i=-N}^{N} C_h \cdot z(kT-iT) - R_k \right| \downarrow \sum_{\substack{k=-N \\ k\neq h}}^{N} |d_h \cdot z(kT-hT)| \downarrow |e(hT) \downarrow d_h \cdot z(O)| \\ &= F - \left( |e(hT)| - \sum_{\substack{k=-N \\ k\neq h}}^{N} |d_h| \cdot |z(kT-hT)| - |[|e(hT)| \downarrow e^*(hT) \cdot |e(hT)|^{-1} \cdot d_h \cdot z(O)]| \right) \end{aligned} \qquad (6)$$

described and discussed so as to make a sum F given by $$F = \sum_{k=-N}^{N} |e(kT)|$$

decrease, the errors $e(kT)$ must also monotonously decrease. Such adjustment of the variable gains $C_h$ are successively carried out for the demodulated signals derived for the respective test pulses until the optimum gains are eventually obtained which are the solutions of Equations (2). It may now be appreciated that the predetermined interval is equal to $(2N+1)T$. When a similar sum F′ given by $$F' = \sum_{\substack{k=-N \\ k\neq 0}}^{N} |e(kT)|$$

is made to approach zero upon the repeated adjustment of the variable gains $C_h$ except $C_0$ which is an invariant, the errors $e(kT)$ are also made to converge to zero. The gains for $h = \pm 1, \pm 2, \ldots, \pm N$ for which the latter sum F′ reach a minimum as well as the gain $C_0$ are the solutions of Equations (3). In practice, the numbers $m$ and N may be about 60 and 21, respectively.

For the purpose of more particularly describing an example of simple algorithms for making the first sum F consecutively tend to zero, let it be assumed that $$\sum_{k=-\infty}^{\infty} |z(kT)| - |z(0)| < |z(0)|/\sqrt{2} \qquad (4)$$

holds in addition to Inequality (1). In this event, the variations $d_h$ for either the real or the imaginary part of the variable gains $C_h$ be selected from the unit amount of adjustment D and −D on the one hand or $j$D and $-j$D on the other hand, respectively, of which the unit adjustment D is a real positive amount discussed later, in accordance with the following set of rules for selection:

$$\left.\begin{aligned} d_h &= D \text{ — when — } -\mathrm{Re}[z(0)\cdot e^*(hT)] > |\mathrm{Im}[z(0)\cdot e^*(hT)]|, \\ d_h &= -D \text{ — when — } \mathrm{Re}[z(0)\cdot e^*(hT)] > |\mathrm{Im}[z(0)\cdot e^*(hT)]|, \\ d_h &= jD \text{ — when — } \mathrm{Im}[z(0)\cdot e^*(hT)] > |\mathrm{Re}[z(0)\cdot e^*(hT)]|, \\ &\text{and} \\ d_h &= -jD \text{ — when — } -\mathrm{Im}[z(0)\cdot e^*(hT)] > |\mathrm{Re}[z(0)\cdot e^*(hT)]|, \end{aligned}\right\} (5)$$

when the $h$-th variable gain $C_h$ only is varied by the variation $d_h$. In order that the increment $\Delta F_h$ be negative, the second term put in the parentheses of the last right hand side of Formulae (6) should be positive. In other words, the algebraic sum of the first and the second terms in the parentheses should be greater than the third term. For clarity, the expression in the brackets in the third term is now represented by a complex variable $G(hT)$.

Figures 4, 5:
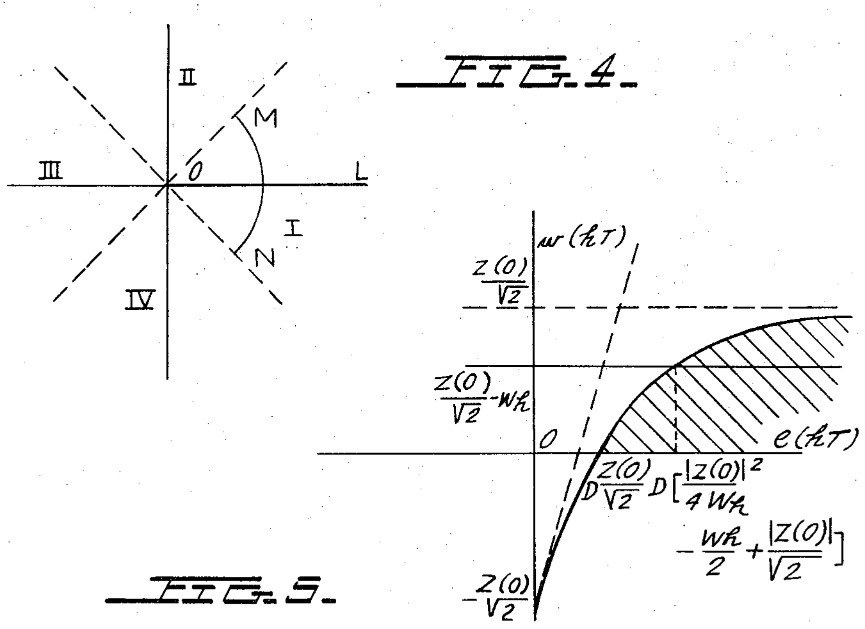
FIG. 4 illustrates a complex plane for explaining the principles of this invention.
FIG. 5 illustrates an $e(hT)$—$w(hT)$ plane for explaining the principles of this invention.

Referring to FIG. 4 illustrative of a complex plane, the complex variable $G(hT)$ will now be considered. In FIG. 4, the first through the fourth quadrants I, II, III, and IV separated by straight lines passing through the origin O and making an angle of 45° with the real and the imaginary axes include the positive sides of the real and the imaginary axes and the negative sides of such axes as shown. The first term $|e(hT)|$ of the variable $G(hT)$, being real and positive, may be represented by a straight line segment OL placed on the positive side of the real axis. The second term of the variable $G(hT)$ falls in the third quadrant III because the variation $d_h$ is selected in accordance with Rules (5). Addition of the second term given by a complex point in the third quadrant III is equivalent to subtraction from the first term of the second term transferred to another complex point that is in symmetry with the point in the third quadrant III with respect to the origin O. The second term so transferred is represented by a point on a circular arc MN in the first quadrant I of the radius given by $D\cdot|z(0)|$. The variable $G(hT)$ is now represented by the pertinent one of the distances between the point L and the arc MN. The maximum absolute value of the variable $G(hT)$ is therefore given by the length of a straight line segment LM, which is given by $$\mathrm{Max}|G(hT)| = \sqrt{|e(hT)|^2 \downarrow D^2\cdot|z(O)|^2 - \sqrt{2}D\cdot|z(O)|\cdot|e(hT)|}.$$

In order that the sum F may decrease when the real or the imaginary part of the $h$-th variable gain $C_h$ is varied by an amount $d_h$ selected in accordance with Rules (5), it is therefore sufficient that $$|e(hT)| - D\cdot w(hT) > \mathrm{Max}|G(hT)| \qquad (7)$$

should hold, where new variables $w(hT)$ defined by $$w(hT) = \sum_{k=-N}^{N} |z(kT-hT)| - |z(O)|$$

are introduced for the sake of simplicity. From Inequality (1) it will be seen that the new variables $w(hT)$ are an approximate measure of the intersymbol interferences of the unit impulse response characteristic. An equality obtained by substituting an equality sign for the inequality sign in Inequality (7) represents that portion of the lower branch of a hyperbola intersecting the $e(hT)$ axis at $$e(hT) = D \cdot |z(0)| \sqrt{2}$$

and having a pair of asymptotes given by $$w(hT) = |z(0)| \sqrt{2} \quad (8)$$

and $$w(hT) = 2|e(hT)|/D - |z(0)| \sqrt{2},$$

which lies above the $e(hT)$ axis as shown in FIG. 5. It is now understood that Inequality (7) holds for any values of the errors $e(hT)$ and the approximate intersymbol interference measures $w(hT)$ that fall within the hatched area illustrated in FIG. 5. From the asymptote given by Equation (8), it is possible to put $$w(hT) = |z(0)| \sqrt{2} - W_h, \quad (9)$$

where $W_h$ represents such a positive constant smaller than z(0) 2 as may be determined by the unit impulse response characteristic and the number $h$. It is now understood that the approximate intersymbol interference measure $w(hT)$ for a particular number $h$ is represented by a straight line drawn in FIG. 5 parallel to the $e(hT)$ axis and that the errors $e(hT)$ given by $$e(hT) > D \cdot [\,|z(0)|^2/(4W_h) - W_h/2 + |z(0)| \sqrt{2}] \quad (10)$$

for such an approximate intersymbol interference measure fall within the hatched area. The latter fact shows that the successive correction method is valid while the errors $e(hT)$ satisfy Inequality (10). Incidentally, Equality (9) is consistent with Inequality (4).

In order that the sum F may converge to zero due to the repeated adjustment of the variable gains $C_h$ from the initial values eventually to the optimum values, it is seen from Inequality (10) that the unit amount D of adjustment be sufficiently small. For $k=0$, the error $e(0)$ is given by $$e(O) = \sum_{h=-N}^{N} C_h \cdot z(-hT) - R_O,$$

where the variable gain $C_0$ must successively be varied by the respective amounts $d_0$ in response to the unit impulse response characteristic $z(t)$ in such a manner that the absolute value of the greatest term $|C_0 \cdot z(0)|$ in the summation may converge into the real number $R_0$. This means that the successive variations $|d_0 \cdot z(0)|$ of the O-th variable gain $C_0$ must be sufficiently small as compared with the real number $R_0$. In other words, the unit amount of adjustment D should satisfy $$D << R_0/|z(0)|.$$

A similar algorithm is available to make the other sum F′ to converge to zero. It is, however, to be noted here that the O-th gain $C_0$ is kept invariant and that the unit amount of variation D should satisfy $$D << |C_0|.$$

Figure 6:
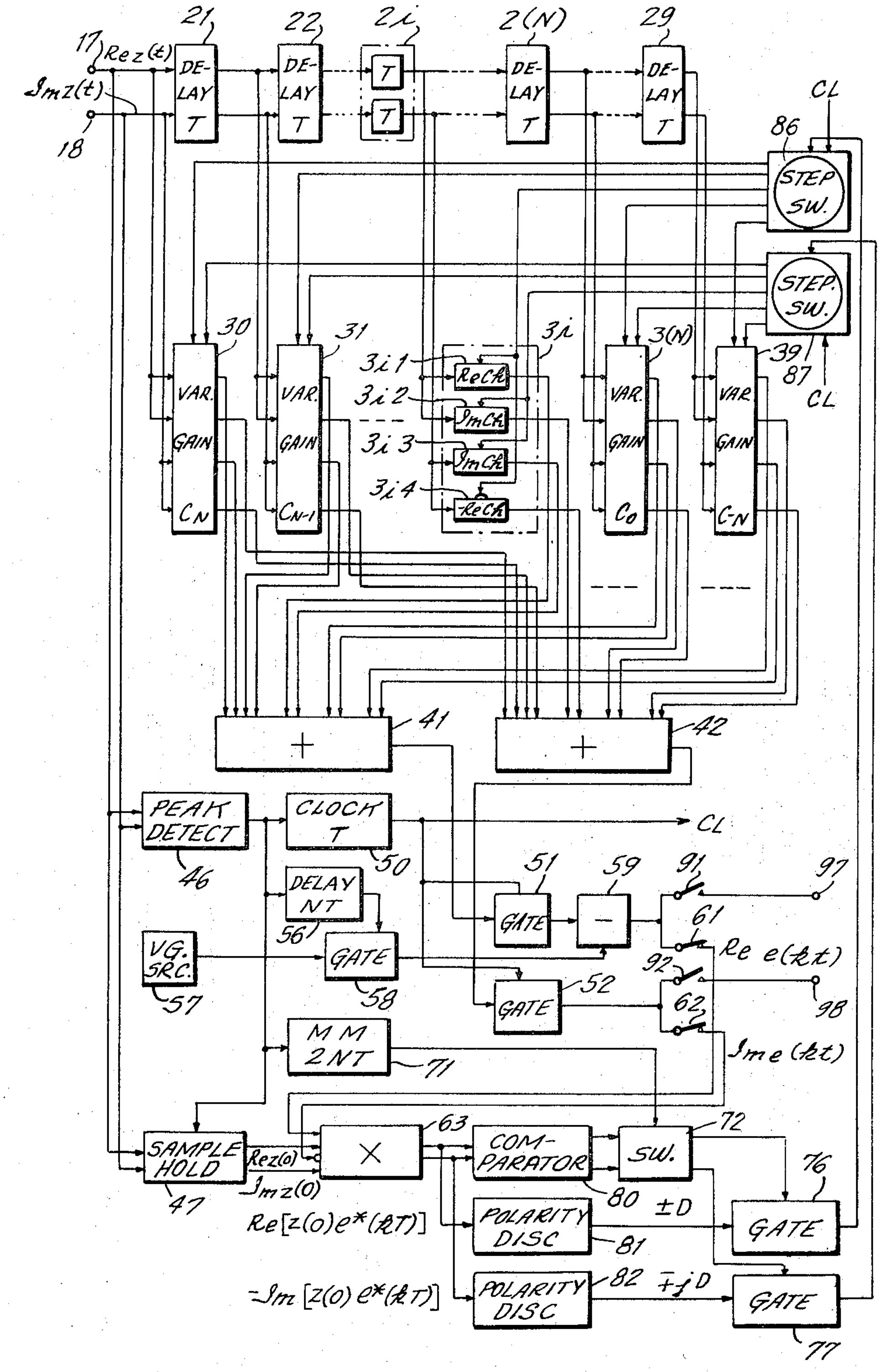
FIGS. 6 and 7 are block diagrams of a first and a second embodiment of this invention.

Referring now to FIG. 6, a first embodiment of the instant invention for carrying out the simple example of the algorithms for making the first sum F to monotonously approach zero comprises a first and a second input terminal 17 and 18 which are the reproductions of the output terminals 17 and 18 shown in FIG. 1 and are supplied with the real and the imaginary parts Re $z(t)$ and Im $z(t)$ of the unit impulse response characteristic or the demodulated signal for each of the test pulses during presetting of the equalizer. The embodiment further comprises delay units 21, 22, . . . , 2i, . . . , 2(N), . . . , and 29, 2N in number, successively connected with both of the input terminals 17 and 18, each including a first and a second delay circuit for giving a common delay time T to the real and the imaginary part input signals, respectively, and variable gain units 30, 31, . . . , 3i, . . . , 3(N), . . . , and 39, 2N + 1 in number, connected with both of the input terminals 17 and 18 and the output terminals of the delay units 21, . . . , 2i, . . . , 2(N), . . . , and 29, respectively. For convenience of description, the input terminals 17 and 18 may be regarded as the output terminals of an additional delay unit 20, not shown. The variable gain units 30, 31, . . . , 3i, . . . , 3(N), . . . , and 39 provide variable gains $C_{-N}$, $C_{-(N-1)}$, . . . , $C_h$, . . . , $C_0$, . . . , and $C_N$ to the output signals of the delay units 20, 21, . . . , 2i, . . . , 2(N), . . . , and 29, respectively. More particularly, each variable gain unit 3i includes a first and a second variable gain circuit 3i1 and 3i2 for giving variable gains Re $C_h$ and Im $C_h$ to the output signal derived from the corresponding one of the first delay circuits and a third and a fourth variable gain circuit 3i3 and 3i4 for subjecting the output signal of the associated second delay circuit to variable gains Im $C_h$ and −Re $C_h$. The variable gains $C_h$ are variable in the manner later described. The embodiment still further comprises a first adder 41 for summing up the amplitude varied signals derived from the first and the third variable gain circuits 3i1 and 3i3, a second adder 42 for summing up the amplitude varied signals derived from the second and the fourth variable gain circuits 3i2 and 3i4, a peak detector 46 connected with both of the input terminals 17 and 18 for producing a peak detection pulse each time the absolute value of the complex signal amplitude reaches the greatest value, a sample holder 47 connected with the input terminals 17 and 18 and responsive to the peak detection pulse for holding the real and the imaginary amplitudes of the greatest absolute value, a clock pulse generator 50 triggered by the peak detection pulse for producing clock pulses CL of the repetition period T, and a first and a second gate circuit 51 and 52 responsive to the clock pulses for momentarily gating the summation signals delivered thereto from the first and the second adders 41 and 42, respectively. When the peak detection pulse causes the clock pulse generator 50 to produce a first one of the clock pulses CL, the output signal of the additional delay unit 20 is $z(0)$. Assuming that the first one of the clock pulses CL defines the earliest sampling time $-NT$, it is seen that the delay units 20, 21, . . . , 2*i*, . . . , 2(N), . . . , and 29 simultaneously deliver a predetermined number of demodulated signal samples $z(0)$, $z(-T)$, . . . , $z(-hT)$, . . . , $z(-NT)$, . . . , and $z(-2NT)$, namely, $z(kT - hT)$ for $k = -N$ and $h = -N$, . . . , 0, 1, . . . , and N, to the respective variable gain units 30, 31, . . . , 3*i*, . . . , 3(N), . . . , and 39 and that the gate circuits 51 and 52 provide the summation of the amplitude varied signal samples $C_h \cdot z(kT - hT)$, namely, the error signal $e(-NT)$ for the instant moment. In addition, it is seen that the sample holder 47 holds the real and the imaginary amplitudes Re $z(0)$ and Im $z(0)$. It is to be noted here in order for the variable gain units 3*i* to output the amplitude varied signal samples mentioned above that each variable gain may be provided by a high impedance, such as the impedance between the cathode and the grid of a vacuum tube, that is varied by controlling the resistor of the cathode follower.

Further referring to FIG. 6, the embodiment comprises a single delay circuit 56 for delaying the peak detection pulse for a delay time NT, a voltage source 57 for producing a constant voltage representative of the predetermined real number $R_0$, a single gate circuit 58 responsive to the delayed peak detection pulse for instantaneously gating the constant voltage, a subtractor 59 for subtracting the instantaneous constant voltage from the output signal of the first gate circuit 51, a first and a second switch 61 and 62, a multiplier 63 supplied with the output signal of the subtractor 59, the inverted output signal of the second gate circuit 52, and the output signals of the sample holder 47. Inasmuch as the delayed peak detection pulse appears at the sampling time $kT$ where $K$ is now equal to $-N+N=0$, it is understood that the demodulated signal samples derived from the delay units 20, 21, . . . , and 29 are now $z(NT)$, $z([N-1]T)$, . . . , and $z(-NT)$ and that the signals derived from the first and the second switches 61 and 62 to the multiplier 63 are always the real parts of the error signal $e(kT)$. The multiplier 63 thus derives the real and the polarity reversed imaginary parts of the product $z(0) \cdot e^*(kT)$. The embodiment further comprises a monostable multivibrator 71 triggered by the peak detection pulse for producing a switching signal for the duration of 2NT, a single switch 72 closed by the switching signal, a third and a fourth gate circuit 76 and 77, a comparator 80 responsive to the real and the polarity reversed imaginary parts of the product $z(0) \cdot e^*(kT)$ for supplying a gating pulse to the third or the fourth gate circuit 76 or 77 through the single switch 72 when the absolute value of the real part or of the polarity reversed imaginary part is greater than the other, respectively, a first polarity discriminator 81 responsive to the real part of the product for delivering a voltage representative of the unit amount of adjustment D and another voltage indicative of the sign reversed unit amount of adjustment $-D$ to the third gate circuit 76 when the sign of the real part is positive and negative, respectively, a second polarity discriminator 82 responsive to the polarity inverted imaginary part of the product for supplying the fourth gate circuit 77 with a voltage representative of the negative imaginary unit variation $-jD$ and another voltage indicative of the positive imaginary unit adjustment $jD$ according as the sign of the polarity inverted imaginary part is positive and negative, respectively, and a first and a second stepping switch 86 and 87 simultaneously stepped by the clock pulses CL. When the positive or the negative unit amount of adjustment D or $-D$ is produced, the first stepping switch 86 supplies the amount to the pertinent one of the first variable gain circuits 3*i*1 to add the amount to the variable gain $C_h$ contained therein and to the pertinent one of the fourth variable gain circuits 3*i*4, with the polarity reversed, to subtract the amount from the variable gain $-$Re $C_h$ contained therein. If either the positive or the negative imaginary unit amount of variation $jD$ or $-jD$ is produced, the second stepping switch 87 supplies the amount to the pertinent ones of the second and the third variable gain circuits 3*i*2 and 3*i*3 to add the amount to the variable gain Im $C_h$ contained in both of the pertinent ones. The pertinent one of the variable gain units 30, 31, . . . , and 39 is the one that contains the variable gain $C_h$ whose number $h$ is equal to the number $k$ of the sampling times $kT$. When the $(2N+1)$-th one of the clock pulses CL representative of the sampling time NT appears, it is now appreciated that the output signals of the delay units 20, 21, . . . , and 29 are $z(2NT)$, $z([2N-1]T)$, . . . , and $z(0)$, respectively, and that the N-th variable gain $C_N$ is adjusted by the amount $d_N$. At this time the monostable multivibrator 71 opens the single switch 72.

The circuit comprising the delay units 20 (terminals 17 and 18), 21, 22, . . . , 2*i*, . . . , and 29, variable gain units 30, 31, . . . , 3*i*, . . . , and 39, and the adders 41 and 42 is a two-dimensional transversal filter. This is also true of the corresponding circuit of FIG. 7 to be described hereinbelow.

Still further referring to FIG. 6, the variable gains $C_h$ are adjusted in the manner described above, from $C_h^{(0)}$ to $C_h^{(1)}$, from $C_h^{(1)}$ to $C_h^{(2)}$, . . . , and eventually from $C_h^{(m-1)}$ to $C_h^{(m)}$. The embodiment comprises a pair of switches 91 and 92 connected with the subtractor 59 and the second gate circuit 52, respectively, and a pair of output terminals 97 and 98 connected with the switches 91 and 92, respectively. After the $m$-th gains $C_h^{(m)}$ are attained at the time of the N-th sampling time for the $m$-th congruent unit impulse response characteristic, the first and the second switches 61 and 62 preceding the multiplier 63 are opened and instead the switch pair 91 and 92 are closed by means not shown, and the demodulated signal $Z(t)$ for the communication code pulses may be supplied to the input terminals 17 and 18. It will now be understood that the embodiment so preset now provides the substantially equalized signal $S(t)$ for the demodulated signal $Z(t)$ at the output terminals 97 and 98.

Figure 7:
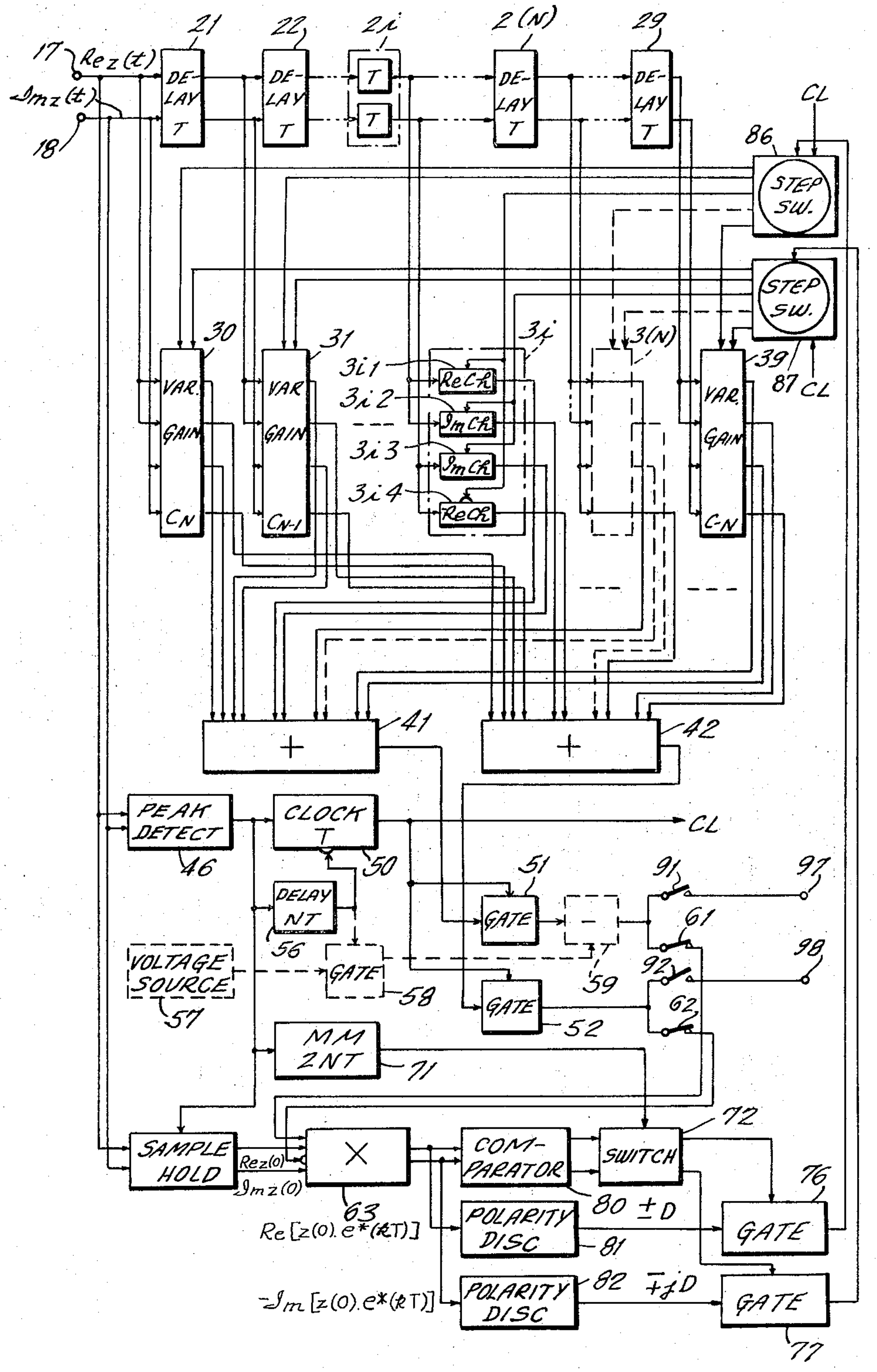

Referring finally to FIG. 7, a second embodiment of the present invention for carrying out the simple example of the algorithms for making the second sum F′ to monotonously approach zero comprises a considerable number of circuit elements similar to those illustrated with reference to FIG. 6 and designated with like reference numerals. The second embodiment, however, may not comprise the variable gain unit 3(N) in accordance with the fact that the O-th gain $C_0$ is an invariant here. The voltage source 57, the gate circuit 58 therefor, and the subtractor 59 used in the first embodiment and depicted in FIG. 7 with broken lines may also be dispensed with because it is not necessary to subtract the predetermined number $R_0$ from the O-th error signal $e(0)$. The single delay circuit 56 may supply the delayed peak detection pulse to a specifically provided inhibit input terminal of the clock pulse generator 50 so as to inhibit that N-th one of the clock pulses CL which otherwise delivers from the adders 41 and 42 the O-th error signal $e(0)$. Alternatively, the second embodiment may comprise all circuit elements of the first embodiment except means for adjusting the O-th so-to-speak variable gain $C_0$ which is now the unit gain. More particularly, the second embodiment does not comprise the connections between the O-th gain unit 3(N) or may further comprise means for disabling such connections.

While two specific embodiments for carrying out two typical algorithms for determining the optimum variable gains $C_h$ are described above, various modifications not mentioned above are possible. For example, the cascaded delay units 21, 22, . . . , and 29 may be a 2N-stage register. The clock pulses CL may be produced in various other ways. The variable gains $C_h$ and the amounts of adjustment $d_h$ therefor may be determined in consideration of the successive inevitable decrease in the output signal level of the delay units 21, 22, . . . , and 29. Instead of actually generating a limited number of the test pulses at the transmitting end, the quadrature amplitude modulated signal for a single test pulse may be received and stored at the receiving end to be repeatedly used a limited number of times for presetting the equalizer. In addition, the number $m$ of the repeated use of the unit impulse response characteristic may not be prescribed but the successive correction may be carried out until the desired approximation of the equalized unit impulse response characteristic is achieved. The number of the variable gain units may not be odd but even. Such variable gain units may be asymmetrically arranged with respect to that containing the O-th gain $C_0$. It is to be noted, however, in this latter case that the single delay circuit 56 should delay the peak detection pulse by an accordingly calculated amount.

What is claimed is:

1. An equalizer for equalizing demodulated signals obtained by demodulating quadrature amplitude modulated signals sent thereto through a transmission line having an impulse response characteristics from a transmitting end for series of communication code pulses generated thereat at a predetermined code pulse interval T, comprising a two-dimensional transversal filter having variable gain units of complex variable gains $C_k$ and responsive to said demodulated signals for producing equalized signals, the letter $k$ being representative of at least a predetermined number of a plurality of consecutive integers including zero, a clock pulse generator for producing clock pulses whose repetition period is substantially equal to said code pulse interval, and means for presetting said variable gains in response to a limited number of test signals supplied to said equalizer, each of said test signals being representative of said impulse response characteristics and given by a complex signal $z(t)$, where $t$ represents time for each of said test signals, said complex signal having the greatest complex amplitude $z_0$ substantially at $t=0$, the greatest complex amplitudes of said test signals being spaced with respect to time at least said code pulse interval multiplied by the number of said integers, said gain presetting means comprising:

means responsive to said clock pulses and a quasi-equalized complex signal $s(t)$ produced by said transversal filter responsive to each of said test signals for producing complex error signals representative of errors $e(kT)$ of said quasi-equalized signal at time points $kT$, means responsive to each of said test signals for holding a greatest amplitude complex signal representative of the greatest amplitude of each test signal, means responsive to each of the error signals produced responsive to each of said test signals and the greatest amplitude signal held for each test signal for producing an adjustment signal representative of a complex amount of adjustment $d_h$ determined in accordance with a set of rules given by $d_h = D$ — when — $-\mathrm{Re}[z(0)\cdot e^*(hT)] > |\mathrm{Im}[z(0)\cdot e^*(hT)]|$, $d_h = -D$ — when — $\mathrm{Re}[z(0)\cdot e^*(hT)]| > |\mathrm{Im}[z(0)\cdot e^*(hT)]|$, $d_h = jD$ — when — $\mathrm{Im}[z(0)\cdot e^*(hT)] > |\mathrm{Re}[z(0)\cdot e^*(hT)]|$, $d_h = -jD$ — when — $-\mathrm{Im}[z(0)\cdot e^*(hT)] > |\mathrm{Re}[z(0)\cdot e^*(hT)]|$, where $h$ is that one of the integers $h$ which gives the error $e(hT)$ represented by said each error signal, D is a predetermined amount, $j$ is the imaginary unit, Re and Im represent the real and the imaginary parts, and $e^*(hT)$ is the conjugate complex number of the last-mentioned error, and means responsive to said clock pulses and said adjustment signal for adjusting that one of said variable gains by the amount of adjustment $d_h$ represented by the last-mentioned adjustment signal which has the same suffix $h$ as the last-mentioned amount of adjustment.

2. An equalizer as claimed in claim 1, wherein said adjustment signal producing means comprises:

multiplier means responsive to each of the error signals produced responsive to each of said test signals and the greatest amplitude signal held for said each test signal for producing a product signal representative of a product $Z_0\,e^*(hT)$, said conjugate complex number being derived by reversing the polarity of the real part component of said each error signal, real part polarity discriminator means responsive to the real component of said product signal for deriving the real part component adjustment signal representative of one of said predetermined number D and the sign-reversed predetermined number $-D$ that is selected in compliance with the polarity of said real part component of said product signal as discriminated, imaginary part polarity discriminator means responsive to the imaginary part component of said product signal for deriving an imaginary part component adjustment signal representative of one of said predetermined number D and the sign-reversed predetermined number $-D$ that is selected in compliance with the polarity of said imaginary part component of said product signal as discriminated, comparator means responsive to said product signal for comparing the real part of said product with the absolute value of the imaginary part of said product to selectively produce a first signal when the former is greater than the latter and a second signal when the former is smaller than the latter, and gate means responsive to said real and said imaginary part component adjustment signals and one of said first and second signals produced by said comparator for producing said adjustment signal.

3. An equalizer as claimed in claim 1, said predetermined number of integers including zero, wherein said error signal producing means comprises:

means responsive to each of said test signals, said clock pulses, and said error signals for subtracting a predetermined amount from the amplitude of the quasi-equalized signal produced at $t=0$ to provide an error signal representative of an error $e(0)$ for $h=0$.

4. An equalizer as claimed in claim 1, wherein said error signal producing means is further responsive to said equalized signals to produce those error signals for said equalized signals which are the substantial reproductions of said communication code pulses.

* * * * *